Patented Nov. 1, 1938

2,135,457

UNITED STATES PATENT OFFICE 2,135,457

SEPARATION OF THE CONSTITUENTS IN ORGANIC COMPLEXES

Donald J. Loder, Wilmington, Del., assignor to E. I. du Pont de Nemours & Company, Wilmington, Del., a corporation of Delaware No Drawing. Application December 13, 1935, Serial No. 54,330

7 Claims. (Cl. 260—540)

This invention relates to a process for the separation of organic complexes into their constituents and more particularly to a process for the recovery of the organic constituent from complexes formed between organic compounds and boron-halogen-containing compounds.

An object of the present invention is to provide a process for the recovery of the constituents present in a complex containing the same. Another object of the invention is to provide a process whereby complexes containing an organic constituent and an inorganic constituent can be separated into the organic constituent and the inorganic constituent. A further object of the invention is to provide a process wherein a complex containing an organic constituent and a boron-halogen-containing constituent can be freed of the organic constituent by the addition of another organic compound. A more specific object of the invention is to provide a process for the separation of aliphatic organic ethers from their complex or association with boron halides by adding thereto aliphatic organic esters. Other objects and advantages of the invention will hereinafter appear.

In the manufacture of various organic compounds in the presence of boron-halogen-containing compounds, and like condensing agents which form complexes with the products of the reaction, it is generally necessary to separate the product desired; namely, the organic compound from the complex. Heretofore the separation has generally been accomplished, particularly when employing the Friedel-Crafts type of reaction and condensing agents, by the hydration of the condensing agents which may be accomplished by plunging the crude product into a bath containing ice and water. The condensing agent which is of an anhydrous nature is thereby hydrated and the organic product which is highly diluted is subsequently removed by various means. Naturally the activity of the condensing agent is completely destroyed and must be dehydrated prior to reuse and the organic product must be concentrated.

I have found that products resulting from such reactions or products resulting from other reactions, in which a crude material is obtained containing a complex formed between an organic compound and an inorganic condensing agent may be purified without substantial destruction of the condensing agent and without dilution of the synthesized product. This is accomplished by adding to the reaction product, preferably in excess, an organic compound which readily forms a complex with the condensing agent or which at least reacts exothermically therewith.

The organic compounds which are thus added to the reaction product, and which hereinafter will be generally referred to as the organic addition agents, should preferably have a heat of reaction with the inorganic constituent not markedly different from the heat of reaction of the organic product with the inorganic constituent, altho this is not an absolute requirement. Under such circumstances it appears that the organic addition agent preferentially combines with the inorganic constituent and to all intents and purposes frees the organic compound which may be removed from the resulting solution by any suitable means, such, for example, by distillation, absorption, extraction, or other methods.

While there appears to be a displacement in the solution of the organic addition agent for the organic compound it may possibly be that an equilibrium is set up in which there exists, in the resulting solution, not only a complex of the product of the reaction but likewise a complex of the organic addition agent. As a result of this equilibrium one would expect to obtain, by removing a constituent from one or the other side of the reaction a predominance of one or the other products of the reaction. Accordingly, the adaptability of my invention for separating the organic constituent of reaction products from their complex with an inorganic compound may be extended to include not only such reaction products but any complexes containing an organic and an inorganic constituent, and more particularly the complexes which are more specially described hereinafter.

While I do not wish to be held strictly to the equilibrium theory, nevertheless this theory of the reaction gives a readily understood picture of the scope and extent of my invention. For example, in the equations listed below it will be seen, as has been described, that by removing from either side of the reaction the uncombined compound it will be possible to remove substantially all of that product from the reaction mixture, and while I do not limit myself to this theory of the invention, nevertheless it appears that such reactions will permit the removal from the reaction mixture of one or more of the products thereof in accord with my invention.

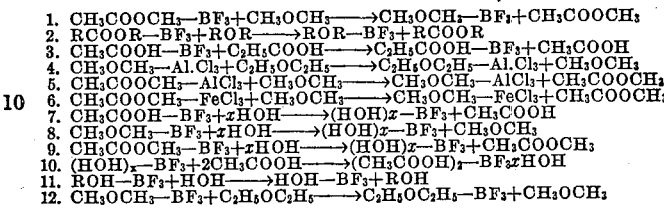

1. $CH_3COOCH_3—BF_3+CH_3OCH_3\longrightarrow CH_3OCH_3—BF_3+CH_3COOCH_3$
2. $RCOOR—BF_3+ROR\longrightarrow ROR—BF_3+RCOOR$
3. $CH_3COOH—BF_3+C_2H_5COOH\longrightarrow C_2H_5COOH—BF_3+CH_3COOH$
4. $CH_3OCH_3—AlCl_3+C_2H_5OC_2H_5\longrightarrow C_2H_5OC_2H_5—AlCl_3+CH_3OCH_3$
5. $CH_3COOCH_3—AlCl_3+CH_3OCH_3\longrightarrow CH_3OCH_3—AlCl_3+CH_3COOCH_3$
6. $CH_3COOCH_3—FeCl_3+CH_3OCH_3\longrightarrow CH_3OCH_3—FeCl_3+CH_3COOCH_3$
7. $CH_3COOH—BF_3+xHOH\longrightarrow (HOH)x—BF_3+CH_3COOH$
8. $CH_3OCH_3—BF_3+xHOH\longrightarrow (HOH)x—BF_3+CH_3OCH_3$
9. $CH_3COOCH_3—BF_3+xHOH\longrightarrow (HOH)x—BF_3+CH_3COOCH_3$
10. $(HOH)x—BF_3+2CH_3COOH\longrightarrow (CH_3COOH)_2—BF_3xHOH$
11. $ROH—BF_3+HOH\longrightarrow HOH—BF_3+ROH$
12. $CH_3OCH_3—BF_3+C_2H_5OC_2H_5\longrightarrow C_2H_5OC_2H_5—BF_3+CH_3OCH_3$ In the reactions R designates an alkyl or aralkyl radical and X a number greater than one.

For example, it will be seen that in Equation 1 it is possible by my process to remove either the dimethyl ether or the methyl acetate from the reaction mixture. In other words, it is possible to separate methyl acetate from its complex with boron fluoride or dimethyl ether from its complex with boron fluoride. If it is desired to remove the methyl acetate, dimethyl ether is added to the methyl acetate-boron fluoride complex, the mixture heated and the methyl acetate removed from the reaction mixture by distillation, for example. The equilibrium will be forced toward the right by the removal of the methyl acetate until eventually substantially all of the methyl acetate can be driven off, leaving a dimethyl ether-boron fluoride complex. Conversely, if it be desired to separate dimethyl ether from its complex with boron fluoride, methyl acetate is added to the complex and by distillation dimethyl ether removed, whereupon substantially all of the dimethyl ether can be separated from its complex, leaving as a residue a methyl acetate-boron fluoride complex.

The reactions illustrated by the equations and like reactions will when treated in substantially the same manner make it possible to recover either one or the other of the compounds present.

The equations given indicate a number of complexes, such, for example, as the aliphatic organic acid complexes with boron halides which can be treated with various addition agents to separate the aliphatic organic acid from its complex with the boron halide, and generally it has been found that the aliphatic organic acids, including those designated, as well as propionic acid, butyric acid, and the higher organic acids which form relatively stable complexes with inorganic compounds may likewise be separated in substantially the same manner. Other organic compounds which can be separated from their complexes include: the ethers, such for example, as methyl ether, ethyl ether, the unsymmetrical ethers, methyl ethyl ether, methyl propyl ether, and the like, as well as the higher aliphatic symmetrical and unsymmetrical ethers; the esters such as methyl acetate, ethyl acetate, methyl propionate, ethyl propionate, methyl butyrate, and like higher alkyl ester of the aliphatic organic acids; the ketones such as dimethyl ketone, diethyl ketone and unsymmetrical ketones, such, for example, as methyl ether ketone, ethyl propyl ketone, and the like; as well as other organic compounds such as the amines, amides, and the like which form relatively stable complexes with inorganic compounds.

The above enumerated organic compounds are readily recoverable from their complex with the boron halogen containing compounds, and more particularly the boron halides such as the chloride, bromide, fluoride, and iodide of boron. Other inorganic halides, however, which form complexes with these organic compounds may likewise be used, although it is understood that from the following lists of inorganic halides which form complexes with the above organic compounds, some are more suitable than others because of the tendency of decomposition, which, however, may be overcome by carrying out the process under suitable temperature and pressure conditions. The inorganic compounds which are generally applicable include more particularly the halides of the amphoteric elements including boron or elements whose oxides upon hydrolysis form weak bases; as for example the inorganic halides such as the halides of aluminum, tin, beryllium, titanium, silicon, zirconium, hafnium, thorium, columbium, phosphorus, chromium, tungsten, sulfur, calcium, barium, strontium and tantalum.

I shall now illustrate by way of examples methods for the separation of the organic constituent of the complex but it will be distinctly understood that the invention shall not be limited to the details therein given.

*Example 1.*—Into a silver lined pressure shaker tube two mols of a water-boron fluoride addition compound containing one mol of water per mol of boron fluoride was charged and ethylene added at cylinder pressure. The temperature was raised from room temperature to between 120 to 150° C., and the reaction continued until one mol of ethylene had been absorbed. A carbon monoxide pressure of 600 to 900 atmospheres was then superimposed on the olefine pressure and the reaction mixture heated to 175 to 180° C., for a period of approximately 30 minutes. The shaker tube was cooled and discharged and the reaction mixture heated, whereupon boron fluoride, equivalent to approximately one-half a mol was driven off. Steam was then injected into the mixture and an aqueous propionic acid condensate was obtained of approximately 70% strength of propionic acid. The crude residue remaining contained a water-boron fluoride addition compound having from 2.3 to 2.5 mols of water per mol of boron fluoride.

*Example 2.*—25 parts by volume of methyl acetate was added to a dimethyl ether-boron fluoride complex containing one mol of dimethyl ether per mol of boron fluoride. The resulting mixture was distilled at a temperature between 38 to 90° C., during which dimethyl ether distilled over leaving a residue containing a methyl acetate-boron fluoride complex.

*Example 3.*—100.8 parts by weight of an acetic acid-boron fluoride complex containing one mol of acetic acid per mol of boron fluoride was charged with 87 parts by weight of propionic acid. The pressure was lowered to approximately 27 mm. of mercury and the mixture distilled at a temperature between 32 and 35.5° C., which corresponds to the boiling point of acetic acid at that pressure. The distillate was very pure acetic acid; 79% of the acetic acid charged was recovered. The residue contained a propionic acid-boron fluoride complex.

*Example 4.*—300 parts of a mixture, obtained by adding 1 part of methanol and 1 part of boron fluoride to 2 parts of water, was charged into an autoclave and brought to a temperature of 230° C., under 850 atmospheres pressure of carbon monoxide. After 2½ hours at pressure with constant agitation the product consisted of a complex containing acetic acid-boron fluoride and water. This mixture was distilled during which 60 parts of water was added. The acetic acid distilled over leaving a complex containing water and boron fluoride.

From a consideration of the above specification it will be realized that many changes may be made in the details of the process therein given without departing from the scope of the invention or sacrificing any of its advantages.

I claim:

1. In a process for the separation of propionic acid from its complex with boron fluoride the step which comprises adding acetic acid thereto and subsequently separating propionic acid from the resulting products.

2. In a process for the separation of an aliphatic organic ether from its complex with a boron fluoride the steps which comprise reacting the organic ether-boron fluoride complex with an aliphatic organic ester and subsequently removing from the reaction mixture the aliphatic organic ether by distillation.

3. In a process for the separation of a simple, lower aliphatic carbon-hydrogen-oxygen compound from its complex with boron fluoride the steps which comprise reacting the complex with a simple, lower aliphatic oxygenated organic addition agent, which is substantially inert with respect to said compound, subsequently separating said compound therefrom and leaving a complex of the boron fluoride and the addition agent.

4. In a process for the separation of an aliphatic organic acid which is distillable without decomposition from its complex with boron fluoride the steps which comprise reacting the organic acid-boron fluoride complex with a simple, lower aliphatic oxygenated organic addition agent, which is substantially inert with respect to the organic aliphatic organic acid, subsequently removing from the resulting mixture the aliphatic organic acid by distillation, and leaving a complex of the boron fluoride and the oxygenated addition agent.

5. In a process for the separation of a simple, lower aliphatic carbon-hydrogen-oxygen compound, distillable without substantial decomposition from its complex with boron fluoride, the steps which comprise reacting the complex with a simple oxygenated aliphatic addition agent, which is substantially inert with respect to said compound, subsequently separating, by distillation, the said compound therefrom and leaving, as the residue, a complex of the boron fluoride and the addition agent.

6. A process for the separation of a simple, lower aliphatic carbon-hydrogen-oxygen compound, distillable without substantial decomposition from its complex with boron fluoride, which comprises adding thereto an excess of a simple, lower aliphatic oxygenated addition agent, which is substantially inert with respect to said compound and which forms a complex with boron fluoride, subsequently distilling from the resulting mixture the said compound and leaving, as the residue, a complex of the boron fluoride and the addition agent.

7. In a process for the separation of acetic acid from its complex with boron fluoride, the steps which comprise reacting the complex with propionic acid and subsequently separating from the resulting mixture the acetic acid.

DONALD J. LODER.